Dec. 30, 1930.     A. T. HOPKINS     1,786,489
HOSE COUPLING
Filed March 28, 1925
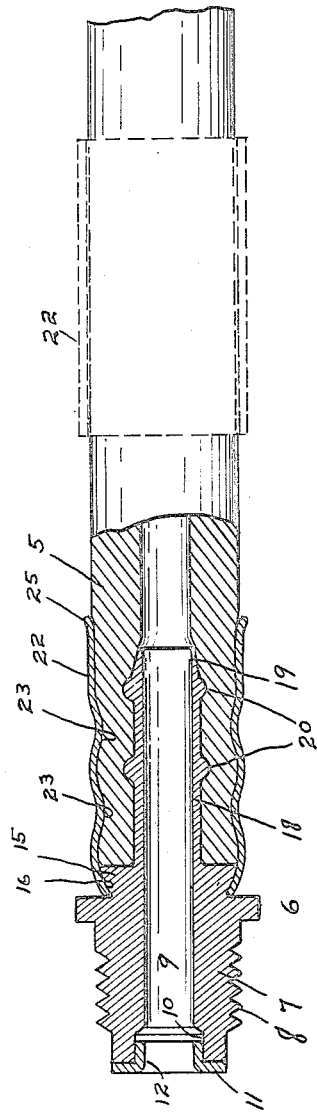
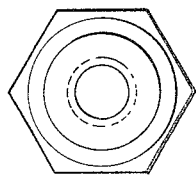
INVENTOR
Arthur T. Hopkins
BY
Francis D. Hardesty
his ATTORNEY Patented Dec. 30, 1930

1,786,489

UNITED STATES PATENT OFFICE

ARTHUR T. HOPKINS, OF DETROIT, MICHIGAN, ASSIGNOR OF ONE-HALF TO R. C. HUPP, OF BIRMINGHAM, MICHIGAN

HOSE COUPLING

Application filed March 28, 1925. Serial No. 19,091.

The present invention relates to a fitting constituting one member of a hose coupling, and has among its objects a fitting which can be assembled with the hose easily and quickly and yet produce a connection which is very much stronger than anything heretofore produced—one which will withstand internal fluid pressure very much higher than that customarily used, making the device especially adapted for use in hydraulic brake connections. Heretofore, in such devices as hydraulic brakes in which flexible connections carrying high internal fluid pressures are used, one of the chief difficulties has been to provide against disconnection of the hose from the metal couplings with the consequent loss of fluid from the system and a failure of the brakes. The present invention has for its specific object a device which will overcome this difficulty.

Reference should be made to the following specification and drawings, in which:—

Fig. 1 shows a longitudinal section through a hose and fitting embodying the invention; and Fig. 2 is an end view of the same from the left.

In the drawings, the hose is indicated at 5, being connected to a fitting indicated as a whole by the numeral 6. The fitting itself is made up of a body portion 7, threaded near one end as at 8 and provided with an axial opening 9. This axial opening is counterbored at the threaded end of the fitting as indicated at 10, and a soft metal gasket 11 is shown as inserted in the end thereof. This gasket consists preferably of a copper disk having a central flanged opening 12, which flange is of such a size as to fit tightly within the countersink 10.

The opposite end of the body portion 7 is provided with an annular shoulder 15 which is of somewhat reduced diameter as compared with the main body portion. This shoulder 15 is also frustro-conical in form with the larger-diameter portion outward from the body portion 7. This formation produces a grooved shoulder, which groove is indicated at 16. While this is the preferred form and the form in which the fitting is being produced, any other suitable form of groove in this shoulder will operate satisfactorily.

Also coaxial with the body portion 7 and shoulder 15 is an extension 18 of sufficiently reduced diameter to allow it to enter the end of the hose 5. This extension is somewhat tapered at its end as indicated at 19 and is provided with peripheral ribs 20.

Surrounding the end of the hose is a sleeve 22 made of a short section of drawn steel tubing which initially is cylindrical as indicated in dotted lines in Fig. 1, but which in its assembled relation is provided with internal ribs 23, as shown, and has its end forced into the annular groove 16 in the shoulder 15. The other end of the sleeve will be slightly flared as shown at 25 in order to provide against cutting the surface of the hose when this is flexed.

In assembling the fitting upon the end of the hose, the sleeve 22 is first slipped over the end of the hose and pushed a short distance from the end thereof as indicated in dotted lines in Fig. 1. After this has been done the extension 18 will be inserted in the end of the hose. The sleeve will then be drawn forward on the hose until the end projects over the groove 16. It should be noted that so far the sleeve is cylindrical in form except for the flanged end 25.

After the assembly has been so far completed, the whole is then put in a machine provided with suitable grooved rollers and the ribs 23 rolled in the sleeve while the end of the sleeve is also being rolled down into groove 16. The ribs 23 are so located as to be in staggered relation longitudinally with the ribs 20 on the extension 18.

By forming the fitting and assembling it in the manner described, it is possible to make the sleeve 22 and extension 18 grip the end of the hose much tighter than in any other fashion heretofore used. In fact, fittings so made have withstood internal pressures on the hose very much higher than any which have been customarily used in such devices as hydraulic brakes.

It should be noted that the invention is not limited to the specific form of device shown but only by the scope of the claims which follow.

I claim:—

1. In combination with a hose end, a coupling member having an enlarged threaded body portion provided with a coaxial reduced, peripherally ribbed extension entering the hose end, and a nut like portion between said threaded portion and said extension, a groove forming shoulder upon the body portion concentric with and adjacent to said extension and spaced from said nut like portion, and a sheet metal cylindrical sleeve surrounding said hose end and extension, said sleeve being internally ribbed in staggered relation longitudinally with the ribs of the said extension, and having one end turned inwardly into the groove between said nut like portion and said shoulder for interlocking engagement with said coupling member.

2. In combination with a hose end, a coupling member having an enlarged threaded body portion provided with a coaxial reduced, peripherally ribbed extension entering the hose end, and a nut like portion between said threaded portion and said extension and having a rear wall from which extends a conical shoulder, concentric with and adjacent to said extension, and a sheet metal cylindrical sleeve surrounding said hose end and extension, said sleeve being internally ribbed in staggered relation longitudinally with the ribs of the said extension, and having one end rolled inwardly upon and behind the conical shoulder and into sealing relation with respect to the rear wall of the nut like portion for interlocking engagement with said coupling member.

3. In combination with a hose end, a coupling member having an enlarged threaded body portion provided with a coaxial reduced, peripherally ribbed extension entering the hose end, and a nut like portion between said threaded portion and said extension and having a rear wall from which extends a conical shoulder, concentric with and adjacent to said extension, and a sheet metal cylindrical sleeve surrounding said hose and extension, said sleeve being internally ribbed in staggered relation longitudinally with the ribs of the said extension, and having one end rolled inwardly upon and behind the conical shoulder and into sealing relation with respect to the rear wall of the nut like portion for interlocking engagement with said coupling member, the other end of said sleeve being outwardly flared.

4. In combination with a hose end, a coupling member having an enlarged threaded body portion provided with a coaxial reduced extension entering the hose end, and a nut-like portion between said threaded portion and said extension and having a rear wall from which extends a conical shoulder, concentric with and adjacent to said extension, and a sheet metal cylindrical sleeve surrounding said hose end and extension, said sleeve being internally ribbed and having one end forced inwardly upon and behind the conical shoulder and into sealing relation with respect to the rear wall of the nut like portion for interlocking engagement with said coupling member.

ARTHUR T. HOPKINS.